Nov. 4, 1930.  W. N. COBBS  1,780,865
LOCOMOTIVE HEADLIGHT
Filed Dec. 22, 1928   2 Sheets-Sheet 1
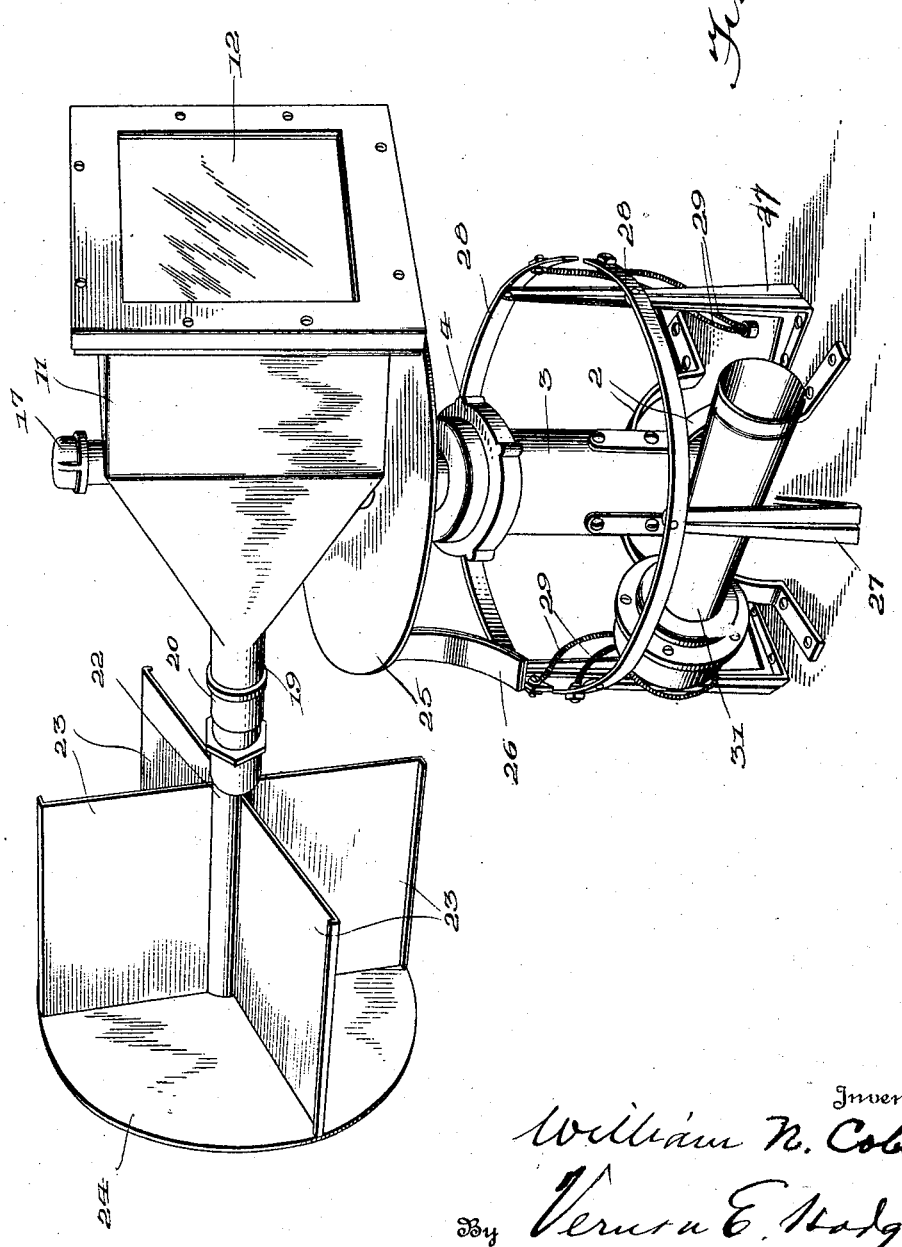
Inventor
William N. Cobbs
By Vernen E. Hodges
his Attorney

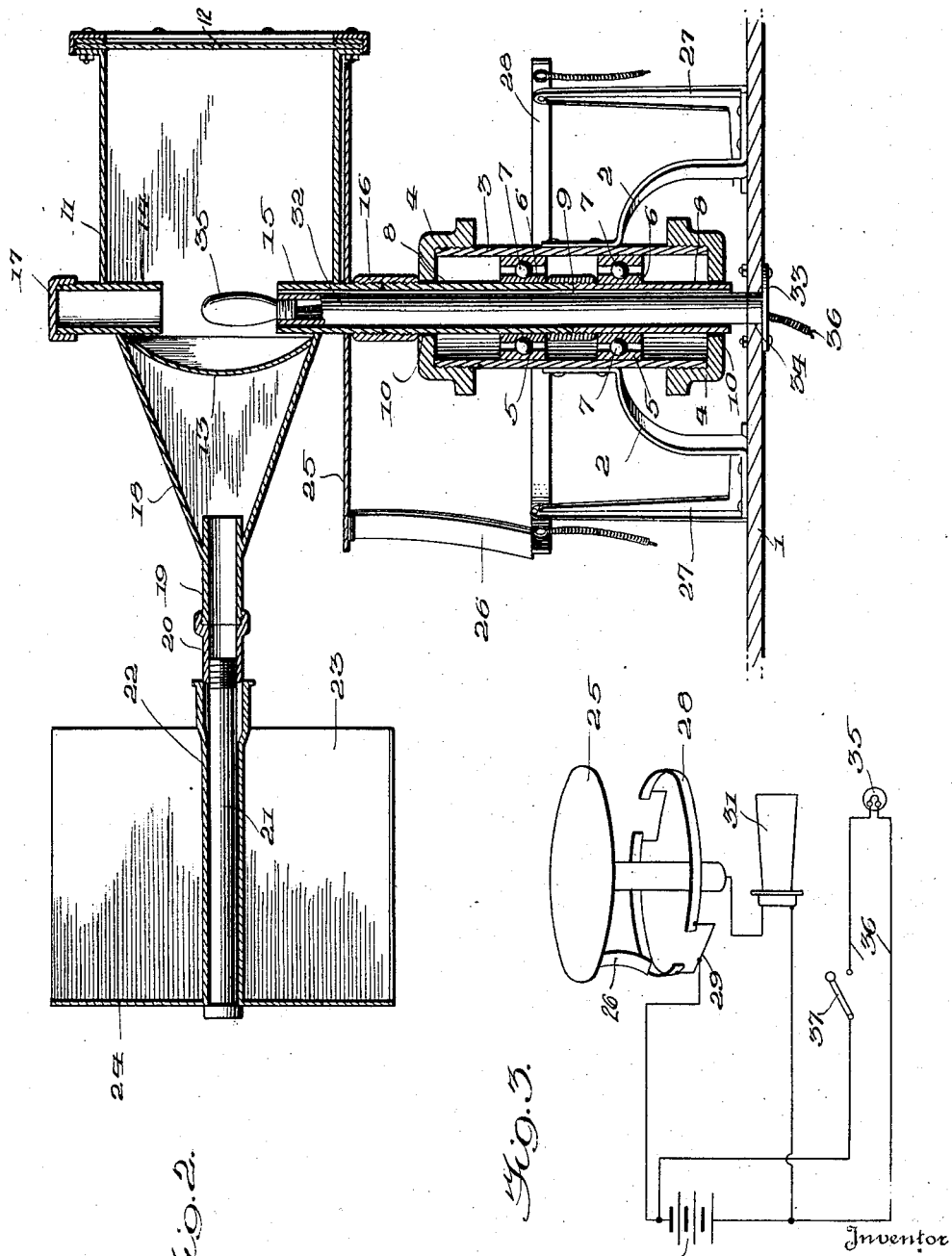

Patented Nov. 4, 1930

1,780,865

UNITED STATES PATENT OFFICE

WILLIAM N. COBBS, OF PITTSBURGH, PENNSYLVANIA

LOCOMOTIVE HEADLIGHT

Application filed December 22, 1928. Serial No. 327,831.

This invention relates to an improvement in locomotive headlights.

One of the objects of the invention is to cause a movement of the headlight of the locomotive corresponding with a change in the direction of the locomotive, so as to illuminate the track around a curve. The headlight ordinarily is directed straight ahead but when the locomotive arrives at a curve it has heretofore been difficult or impossible to illuminate the track around the curve, and it is the purpose of this invention to cause a bodily turning movement of the headlight by the change in the direction of the wind for illuminating the track around the curve.

The headlight is pivotally mounted and connected with suitable vane mechanism, so that when the supporting wheels or trucks of the locomotive turn relative to the locomotive, as in rounding a curve, the change in the direction of the wind will automatically cause a change in the position of the headlight relative to the locomotive, thereby automatically causing an illumination of the track ahead of the locomotive.

Another object of the invention is to automatically cause the actuation of an audible signal, such as a horn carried on the locomotive, whenever the headlight is turned automatically when the locomotive is passing around a curve in the track for the warning of any persons that may be approaching or upon the track at a point around the curve from where the locomotive is not visible.

This is accomplished by the automatic closing of an electric switch through the audible signal by the turning movement of the headlight.

In the accompanying drawings:

Fig. 1 is a perspective view of the invention;

Fig. 2 is a sectional view therethrough; and

Fig. 3 is a diagrammatic view of the electric wiring of the headlight and signal.

The numeral 1 indicates a shelf carried by or a part of a locomotive upon which the headlight is intended to be secured and mounted, and for this purpose brackets 2 are carried by this shelf 1 and extend upwardly therefrom, having at their upper ends a sleeve 3 secured thereto and supported by these brackets.

The opposite ends of this sleeve 3 are closed by caps 4, which are removably secured to the sleeve. Fixed in the intermediate portion of the sleeve 3 are bearing races 5. Companion bearing races 6 are aligned therewith and have ball bearings 7 interposed between these bearing races 5 and 6.

Mounted in the bearing races 6 are tubes 8 in alignment with each other and having their inner ends secured together by a bushing 9, which is interposed between the bearing races 6 and is seated and rides upon the lowermost one of these bearing races. The opposite ends of the tubes 8 project through openings 10 in the caps 4 and are freely rotatable in these openings.

A headlight casing is designated by the numeral 11 and may be of the usual desired construction and character and is provided with the lens 12 and reflector 13. Disposed upon opposite sides of the casing 11 and immediately in front of the reflector 13 are tubes 14 and 15 which are approximately of the same size and shape, and both of said tubes are welded or otherwise securely fastened in the opposite sides of the casing 11 and in alignment with each other.

The tube 15 is secured by means of a bushing 16 to the uppermost supporting tube 8, and since these tubes 14 and 15 are alike and in alignment, either of said tubes may be secured to the said supporting tube 8 by merely reversing the casing 11. The other tube, shown at 14, has a cap 17 mounted thereon to close the outer end thereof.

The casing 11 has a reduced backwardly extending portion 18, terminating in and having secured thereto coupling members 19 and 20. Fixed to the coupling member 20 is a journal rod 21 on which a sleeve 22 is journaled and freely rotatably mounted. The sleeve 22 carries radiating vanes 23 extending outwardly in opposite directions therefrom, and these vanes have the backward ends thereof closed by a plate 24.

A tube 32 has its lower end carried by a plate 33 removably secured to the underside of the shelf 1 and extends through an opening 34 in said shelf and through the tubes 8 and 15 to the inner end of the latter opening, into the casing 11 immediately in front of the reflector 13. The inner end of the tube 32 carries a lamp 35 of a diameter at least as small or smaller than the tubes 8 and 15 or 14 so as to be freely slidable through said tubes.

Electric wires 36 lead to the lamp 35 from the battery 30 for supplying current thereto, and a switch 37 may be arranged in this circuit for breaking the circuit to turn off the light during the daytime.

A disk 25 is fixed to the sleeve 15, and depending from said disk 25 is a flexible contact brush 26. Supported by brackets 27 are segmental contact rings 28 disposed in position to be engaged by the contact brush 26 upon a turning movement of the disk 25, which is caused to be turned with the headlight casing 11. The segmental rings 28 are connected together by the wires 29 and to a battery or other source of electric current, designated as 30 in Fig. 3, the opposite side of which battery is connected with a horn 31 or other audible signal. This horn is grounded to the shelf 1 to which the disk 25 is also grounded through the supporting mechanism for the light casing, or the disk may be suitably connected directly with the horn, as found desirable.

In the operation of the invention, the headlight is mounted on a suitable portion of the locomotive designated as the shelf 1, which is usually carried immediately in front of the boiler of the locomotive and near the top. The headlight casing 11 is rotatably or pivotally mounted on the ball bearings 7 through the supporting tubes 8 and 15 and as the locomotive is running, the velocity of the wind will act on the vanes 23 to maintain the headlight pointed in the directed in which the locomotive is running.

When the trucks or supporting wheels of the locomotive begin to turn, this does not necessarily cause an immediate turning movement of the locomotive itself, as the supporting wheels usually turn relative to the locomotive, so that the headlight if fixed would not be pointing in the direction in which the locomotive is moving around the curve. The pivotal mounting of the headlight casing 11 and the provision of the vanes 23 cause an automatic adjustment of the headlight casing in the direction in which the locomotive is actually running by reason of the velocity of the wind acting on the vanes 23, so as to keep the headlight always in the direction in which the locomotive is running and directed to the track ahead. Any change in the direction of the wind by reason of a change in the direction of the locomotive will cause an immediate and automatic corresponding adjustment of the position of the headlight.

As the disk 25 is carried by the supporting means for the headlight casing 11, this disk will be given a corresponding turn whenever the casing is turned. The flexible brush 25 is normally disposed between the ends of the segmental contact rings 28 but upon a substantial turning movement with the headlight casing and disk 25 therewith, the brush 26 will be moved into contacting engagement with one of the segmental rings 28, which therefore causes a closing of the electric circuit from the battery 30, through the corresponding ring 28, the brush 26, disk 25, tubes 15 and 8, the sleeve 3 and brackets 2 to the supporting plate 1, to which the horn 31 is also grounded, thence from the horn back to the opposite side of the battery 30. This causes an actuation of the horn or similar audible signal automatically upon the turning of the headlight, as in rounding a turn in the track for giving an audible signal and warning to any persons that may be on or approaching the track.

The lamp 35 is sufficiently small to easily slide through the tubes 8 and 15 or 14 so that in removing and replacing the lamp it is only necessary to disconnect the member 33 from the shelf 1 and either slide the tube 33 downward with the lamp 35, which is carried thereby, through the opening 34 in the shelf 1, or, if desired, the tube may be disconnected from the plate 33 and moved upwardly through the tube 14, as found most desirable. This allows for easily removing the lamp from the casing without disturbing the casing in the event that it becomes necessary to replace a burnt-out lamp.

The rotary support for the vanes 23 allows them to turn to prevent the accumulation of snow or ice thereon.

Although the invention is described in connection with a locomotive headlight, it is obvious that it may be applied to other types, as desired.

I claim:

1. The combination of a headlight for a vehicle, tubular supporting means for said headlight for pivotal movement, bearings upon which said tubular supporting means is mounted, means removably projecting through the tubular supporting means and carrying a lamp positioned in the headlight, said lamp being smaller in diameter than the tubular supporting means, and a weather vane connected with the headlight for automatically causing a turning movement thereof corresponding with the direction of movement of the vehicle.

2. The combination of a headlight casing having tubular members projecting thereinto on opposite sides thereof and aligned with each other, a tube aligned with and secured to at least one of said tubular members, bearing supporting means for pivotally supporting said tube and headlight casing, a tube removably extending into the first-mentioned tube and at least one of the tubular members and carrying a lamp of a size not greater than the internal diameter of the first-mentioned tube and tubular member, said lamp extending into the headlight casing and removable therefrom through either of said tubes and means for causing a relative turning movement of the headlight casing about the second-mentioned tube and lamp.

3. The combination with a supporting shelf having an opening therethrough, bearing supporting means mounted upon the shelf, a tube carried by said bearing supporting means and projecting upwardly therefrom, a lamp casing supported by said tube, a tubular member projecting through the opening in the shelf and the tube, and removable therefrom, and a lamp of a diameter less than the diameter of the tube and opening and carried by the tubular member and projecting into the light casing.

4. The combination of a light casing, means for pivotally supporting said light casing for turning movement about an approximately vertical axis, a journal member projecting from a side of said light casing, and vanes rotatably mounted on said journal member for automatically causing a pivotal action of the light casing, thereby changing the direction of light beams.

5. The combination of a headlight casing, means for pivotally supporting said casing for turning movement about an approximately vertical axis, a journal member projecting from the rear side of said casing, a sleeve rotatably mounted on said journal member, and vanes carried by said sleeve for turning movement about the journal member to prevent the accumulation of foreign matter on said vanes.

6. The combination of a headlight casing having tubular members connected therewith on opposite sides thereof and aligned with each other, a tube removably projecting into at least one of said tubular members, and carrying a lamp positioned within the headlight, said lamp being smaller in diameter than the tubular members and removable therethrough.

In testimony whereof I affix my signature.

WILLIAM N. COBBS.